June 30, 1964     SHIGEO TSUJI     3,139,356
DEFERRED-ACTION TYPE SILVER BATTERY
Filed April 12, 1962
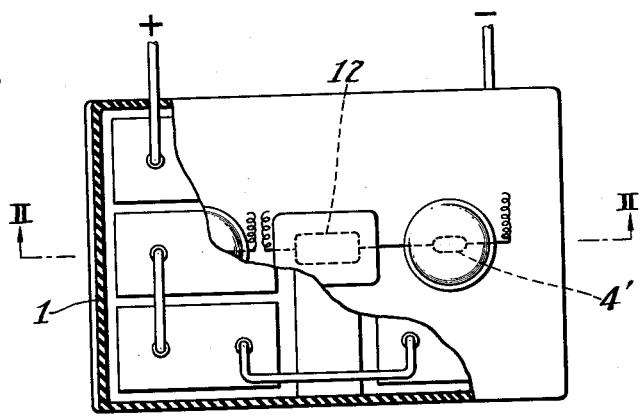
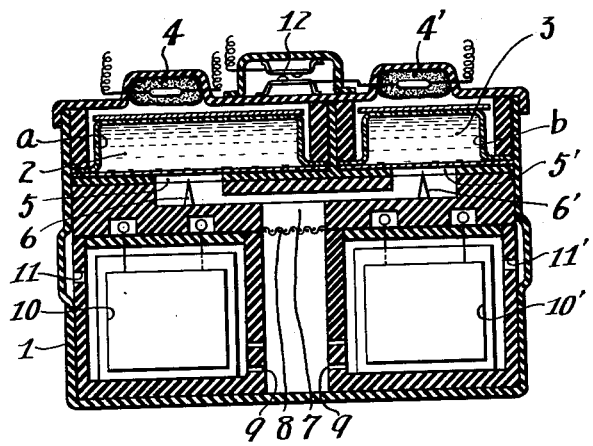
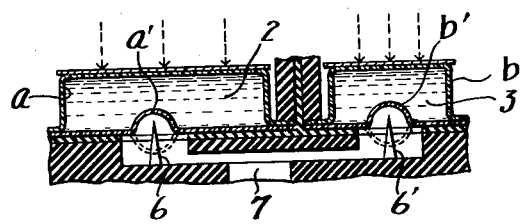
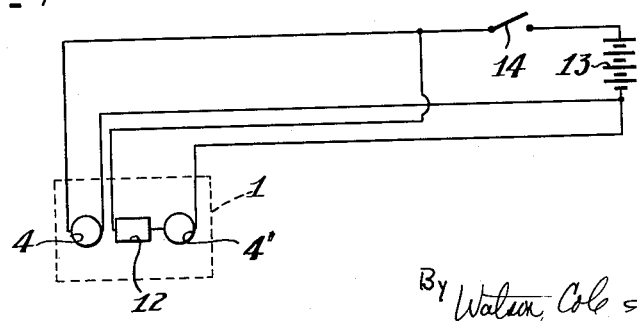
INVENTOR
SHIGEO TSUJI
By Watson, Cole, Grindle & Watson
ATTORNEYS

United States Patent Office 3,139,356
Patented June 30, 1964

3,139,356
DEFERRED-ACTION TYPE SILVER BATTERY
Shigeo Tsuji, Kyoto, Japan, assignor to Yuasa Battery Company Limited, Osaka, Japan, a corporation of Japan
Filed Apr. 12, 1962, Ser. No. 186,997
Claims priority, application Japan Aug. 5, 1961
6 Claims. (Cl. 136—90)

The present invention relates to the deferred-action type silver battery, and more particularly, to a deferred-action type silver oxide-zinc-alkali primary battery, which is capable of discharging instantly and promptly within a wide range of temperatures.

Because of the exceedingly superb efficiency per unit volume, as well as per unit weight, the silver oxide-zinc-alkali battery is widely used on electric instruments which require especially high efficiency. Moreover, there are many occasions when the deferred-action type battery must be capable of being used at a low temperature thereof. A silver battery, however, is usually of unsatisfactory efficiency under a low temperature; especially the deferred-action type battery which requires a long activation time, that is, the length of time taken until it attains a voltage usable under a low temperature. Such time becoming longer as the temperature becomes lower. Thus, the battery of this kind, hitherto in use under a low temperature, has customarily been preliminarily heated by means of the engine exhaust or other outer power sources, so that it may obtain a sufficient level of temperature at use. Such sources of heating, however, may not be available at all times. Thus, demand arises for a device, by which such heating sources are housed in the battery itself, thereby enabling the temperature to be raised whenever it is intended for use.

The first object of the present invention, therefore, is to obtain a small-sized and light-weight battery, which takes an extremely short time for activation in case of rapid discharge under a low temperature.

The second object of this invention is to provide a battery, which even when used under a high temperature, will not be overheated and damaged.

Furthermore, the third object of the present invention is to make available a kind of the deferred-action type silver battery with a relatively uniform capacity in a wide range of temperature for use.

All of these objects for which the present invention is intended will be easily and readily understood by referring to the following statement, and the drawings attached.

FIGURE 1 shows a top plane view of the deferred-action type battery embodying the present invention, a part thereof being cut away for the purposes of showing its interior.

FIGURE 2 is a longitudinal vertical sectional view of the battery taken on the line II—II in FIGURE 1.

FIGURE 3 shows how the bag for containing the electrolyte is broken by a blade.

FIGURE 4 is a view of wiring of the electric circuit for igniting the electric squib of the battery embodying the present invention.

In FIGURES 1, 2, and 4, 1 is a metallic outer box of the battery, having a battery compartment and two liquid compartments. The battery compartment houses more than a cell consisting of silver oxide positives, separators and zinc negatives, while each of the liquid compartments has a bag, made of soft material, containing liquid. 2 is the caustic alkaline electrolyte, contained in bag $a$, made of soft material, for example, of polyethylene. 3 is the water solution of acid contained in a similar polyethylene bag $b$. 4 and 4' respectively are the electric squibs for breaking the bags of caustic alkaline electrolyte 2 and acid 3, both of which being provided in the upper part of the liquid compartment. In the lower part of the liquid compartment, there are holes 5 and 5', which lead to the interior of the cell. These holes 5 and 5' are blocked by the said bags $a$ and $b$, prior to the use of the battery. Below holes 5 and 5', blades 6 and 6' are provided. Here, as shown in FIGURE 3, the tip of the blades 6 and 6' are to be placed in the concave parts $a'$ and $b'$ formed at the bottom of the said bags $a$ and $b$, for the manner as described below and they will be more available in instantly breaking the bags $a$ and $b$.

The electric squibs 4 and 4' are connected with the power source 13 for ignition on the circuit of which the ignition switch 14 is provided. Furthermore, electric squib 4' for acid 3 is connected in series with the thermo-switch 12 on the said circuit. This thermo-switch 12, as the temperature comes down below the prescribed level, say, about 20° C., will close the circuit, and also as the temperature rises above about 20° C., it so works that the circuit will open.

Now, the ignition switch 14 for the power source 13 is closed, and the electric squibs 4 and 4' are simultaneously placed under voltage for driving, when, if the atmospheric temperature is below the prescribed temperature (about 20° C.) of the thermo-switch 12, the electric squibs 4 and 4' will simultaneously ignite and explode, and, by dint of the gas pressure generated by the exploding powder of the electric squibs (as shown by the dotted arrow, FIGURE 3), the concave parts $a'$ and $b'$ formed at the bottom of both liquid bags will be swollen downward (as shown by the dotted line, FIGURE 3), and be readily broken by the blades 6 and 6' with the result that both liquids will simultaneously and instantly flow down, intermixing in the space 7 of the passage, and, by the neutralizing reaction heat, the temperature of the electrolyte will be raised. Here, it is advisable that the alkaline electrolyte be prepared in surplus, and the density and quantity of both liquids be so adjusted that the neutralization density of alkaline electrolyte be on a proper level.

The salt formed by reaction is partly exuded, and filtered by the stainless steel net 8. The electrolyte having temperature of which is thus raised, will flow in through the small hole 9 in the lower part of each cell, immersing the electrodes 10, and the battery will operate.

The electrolyte in surplus will flow out through the upper hole 11. The exhausted electrolyte being in a relatively small amount, could be led to a proper place. It is desirable that it be absorbed by a proper substance, so that other electric instruments may not be adversely affected thereby.

In case the atmospheric temperature at the place where the battery is used, is registered above the prescribed temperature of the thermo-switch (about 20° C.), one electric squib 4 only will be ignited, even though both squibs were placed under voltage, while the other electric squib 4' will not be ignited, because the thermo-switch 12 is open. Accordingly, the alkaline electrolyte 2 alone will be poured in, while the acid liquid 3 will remain in the bag $b$. The temperature of the alkaline electrolyte 2 which is poured in, is sufficiently high to make each cell activated instantly. There is no need, thus, to raise the temperature any further up. What requires special care here is that, when the bag $b$ of the acid liquid 3 is not broken, the alkaline electrolyte 2 with a high density will be poured in directly. But this will be limited to the case when the temperature is high enough (more than 20° C. as the above instance). Here the troubles attendant upon the high density of the alkaline electrolyte 2, for example, a reduction in voltage and the prolongation of the length of time required for activation etc. will not exist. On the contrary, it will be more available toward unifying the performance of the battery over the entire range of temperature.

As already mentioned, the battery embodying the present invention has been specially designed for instant operation. Especially with the high-voltage associated battery, consisting of a plurality of cells, it will be enabled to bring all its capacity into operation, more effectively and strongly in case of the necessity to make it operate in an instant.

In the above, an embodiment of the present invention was shown. Of course it will be obvious that various other modifications are possible. For example, instead of the thermo-switch 12 above mentioned which the ignition of the electric squib 4' for the acid liquid 3 may be controlled automatically to a certain extent in its relation to the temperature, it will be also possible to install a small-size manual switch to open or close depending on the temperature prevailing at the time of use and control the ignition of the electric squib 4' for the acid liquid 3. Also, in case the change in the capacity depending on the temperature for use is permissible to a certain extent, or, in case the battery is not used with an extremely high temperature, these switches may be dispensable.

As caustic alkaline electrolyte, as referred to above, both caustic soda (NaOH) and caustic potash (KOH) may be used, but, in consideration of the capacity for electric conductivity, the use of a KOH solution will be desirable, while, as acid liquid, solutions of hydrochloric acid (HCl), sulfuric acid ($H_2SO_4$) may be used. The solution of hydrochloric acid, when it is preserved for a long period of time in a polyethylene bag, the (HCl) content, contained therein, is liable to escape, and, in view of this, it will be more advisable to use sulfuric acid.

The caustic potash electrolyte will be especially efficient when its density is between 35% and 47%, because below 35%, it will be impossible to obtain a sufficient amount of heat generated, and if a sufficient amount is forced to be generated, the density of the caustic potash of the solution after reaction, will be reduced, preventing the capacity of the battery from being fully displayed. On the other hand, if the density is raised above 47%, its viscosity at a lower temperature will become extremely high, which will relatively retard the speed of flow. In the case of a solution of sulfuric acid, again, the density should advisably range between 50% and 25%, for sufficient efficiency. Below 25%, it will be frozen at about −22° C., and, at a lower temperature, it will not only be unusable, and also the amount of heat generated will become small, and, if the amount is forced to rise, the density of caustic potash after reaction will necessarily be reduced, deteriorating the capacity of the battery. At a density above 50%, on the other hand, reaction will become excessively violent, resulting in a local overheating, or, resulting in a difficulty of a uniform reaction between a large quantity of caustic potash and a small quantity of sulfuric acid, in order to keep the density of caustic potash on a proper level.

With caustic potash and sulfuric acid, as mentioned in the present example, sulfuric potash will be mixed with the solution of caustic potash, after reaction. The evil attendant upon this may be practically negligible, in so far as the present invention is concerned, in the light of the experimental result so far obtained.

Now, an example of the density of both liquids and the amount of heat generated will be shown below.

If 30 parts of 35% solution of sulfuric acid is mixed with 100 parts of 44% solution of caustic potash, the density of caustic potash of the solution after this reaction will become about 31%, while the temperature of the solution will raise by about 43° C. This battery, even when used at −20° C., will take a nearly same length of time for activation as in case of normal room temperature, displaying the same performance as in the case of normal room tempearture. In case it is used at a place having a temperature above +50° C., the temperature of the liquid will easily rise up to about 100° C., simultaneously with the pouring of the liquid, unless the administration of the sulfuric acid solution is discontinued, because of the heat attendant upon reaction. If discharge progresses further, more heat will be generated, and the temperature will be raised up to an extreme extent, when, due to the boiling of the liquid and softening and deformation of the synthetic resin container, etc., such results as the collapse of the plates and the damage of the separator, and, eventually, internal short circuit will be caused.

It should be noted that embodiments and modifications of this invention described already are merely a few of actual applications possible, and, it should be obvious that, in the scope not deviating from the spirit of the present invention, a number of other modifications are possible.

What is claimed is:

1. A deferred-action type silver battery comprising an outer box having a battery compartment containing a plurality of cells consisting of silver-oxide positives, separator and zinc negatives, and having two liquid compartments, one of said compartments containing a caustic potash solution held in a bag made of a soft material and the other of said compartments containing an acid solution held in a similar bag, the respective compartments being provided with electric squibs connected with a power source for ignition at their upper parts and with holes at their lower parts passing through to the inside of each cell in the battery compartment, said holes being blocked by a portion of the said bags, and blades positioned at the vicinity of said holes for breaking said bags; the density and volume of said acid and potash solutions being previously adjusted to provide a caustic alkali solution having the proper density after said solutions have been intermixed and reacted.

2. The deferred-action type silver battery of claim 1, having a thermo-switch in the circuit between the electric squib in the acid solution compartment and the power source for ignition whereby the switch will be automatically opened as the temperature attains a prescribed level.

3. The deferred-action type silver battery of claim 1, wherein the caustic potash solution has a density in the range of 34–47%.

4. The deferred-action type silver battery of claim 1, wherein the acid solution has a density in the range of 25–50%.

5. The deferred-action type silver battery of claim 1, wherein the tip of the blade is provided in the cavity formed at the bottom of the bag made of a soft material.

6. The deferred-action type silver battery of claim 1, which comprises a high voltage associated battery consisting of a plurality of cells containing silver-oxide positives, separator and zinc negatives.

References Cited in the file of this patent

UNITED STATES PATENTS

| | | |
|---|---|---|
| 2,674,946 | Hjelm | Apr. 13, 1954 |
| 2,824,164 | Bauman | Feb. 18, 1958 |
| 2,970,180 | Urry | Jan. 31, 1961 |
| 3,113,891 | Comanor | Dec. 10, 1963 |

FOREIGN PATENTS

| | | |
|---|---|---|
| 616,222 | Canada | Mar. 14, 1961 |